United States Patent
Chang et al.

(10) Patent No.: US 11,176,719 B2
(45) Date of Patent: Nov. 16, 2021

(54) METHOD AND APPARATUS FOR LOCALIZATION BASED ON IMAGES AND MAP DATA

(71) Applicant: Samsung Electronics Co., Ltd., Suwon-si (KR)

(72) Inventors: Hyun Sung Chang, Seoul (KR); Minjung Son, Suwon-si (KR); Donghoon Sagong, Suwon-si (KR); Wonhee Lee, Yongin-si (KR); Kyungboo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/371,305

(22) Filed: Apr. 1, 2019

(65) Prior Publication Data
US 2020/0134896 A1  Apr. 30, 2020

(30) Foreign Application Priority Data

Oct. 24, 2018  (KR) .................. 10-2018-0127589

(51) Int. Cl.
| | |
|---|---|
| *G06T 11/60* | (2006.01) |
| *G06T 7/11* | (2017.01) |
| *G06T 7/73* | (2017.01) |
| *G01C 21/36* | (2006.01) |
| *G06K 9/62* | (2006.01) |

(52) U.S. Cl.
CPC .......... *G06T 11/60* (2013.01); *G01C 21/3638* (2013.01); *G06K 9/6202* (2013.01); *G06T 7/11* (2017.01); *G06T 7/73* (2017.01)

(58) Field of Classification Search
CPC .. G06T 11/60; G06T 7/11; G06T 7/73; G06K 9/6202; G01C 21/3638
See application file for complete search history.

(56) References Cited

U.S. PATENT DOCUMENTS

| | | |
|---|---|---|
| 8,649,565 B1 | 2/2014 | Kim et al. |
| 9,524,434 B2 | 12/2016 | Gee et al. |
| 9,811,731 B2 | 11/2017 | Lee et al. |

(Continued)

FOREIGN PATENT DOCUMENTS

| | | |
|---|---|---|
| JP | 4677981 B2 | 4/2011 |
| JP | 5116555 B2 | 1/2013 |

(Continued)

OTHER PUBLICATIONS

Lepetit, Vincent et al., "EPnP: An Accurate o (n) Solution to the PnP Problem", *International journal of computer vision*, vol. 81, No. 2, 2009 (12 pages in English).

(Continued)

*Primary Examiner* — Kee M Tung
*Assistant Examiner* — Khoa Vu
(74) *Attorney, Agent, or Firm* — NSIP Law

(57) ABSTRACT

Localization apparatuses and methods are disclosed where a localization apparatus extracts a feature of an object from an input image, generates an image in which the object is projected with respect to localization information of a device based on map data, and evaluates the localization information based on feature values corresponding to vertices included in a projection image.

30 Claims, 20 Drawing Sheets

(56) References Cited

U.S. PATENT DOCUMENTS

| | | | | |
|---|---|---|---|---|
| 2010/0098297 | A1* | 4/2010 | Zhang | G06K 9/4652 |
| | | | | 382/104 |
| 2017/0169300 | A1* | 6/2017 | Heisele | G06T 7/74 |
| 2018/0075643 | A1 | 3/2018 | Sequeira et al. | |
| 2018/0253609 | A1* | 9/2018 | Potter | B60Q 1/08 |
| 2018/0283892 | A1* | 10/2018 | Behrendt | G06K 9/6271 |
| 2018/0336697 | A1* | 11/2018 | Lu | G01S 17/89 |
| 2019/0120947 | A1* | 4/2019 | Wheeler | G01S 17/42 |
| 2020/0105017 | A1* | 4/2020 | Gu | G06K 9/3233 |
| 2020/0249032 | A1* | 8/2020 | Lee | G09B 29/006 |

FOREIGN PATENT DOCUMENTS

| | | |
|---|---|---|
| JP | 5808369 B2 | 11/2015 |
| JP | 2017-9554 A | 1/2017 |
| KR | 10-1139389 B1 | 4/2012 |
| KR | 10-2016-0128077 A | 11/2016 |
| KR | 10-2017-0070945 A | 6/2017 |
| KR | 10-2018-0009280 A | 1/2018 |
| KR | 10-2018-0069501 A | 6/2018 |

OTHER PUBLICATIONS

Engel, Jakob, et al., "LSD-SLAM: Large-Scale Direct Monocular SLAM", European conference on computer vision, 2014 (pp. 834-849).

Kunina, I. A., et al. "Aerial Image Geolocalization by Matching Its Line Structure with Route Map", Ninth International Conference on Machine Vision (ICMV 2016), vol. 10341, International Society for Optics and Photonics, Mar. 17, 2017 (8 pages in English).

Lu, Yan et al., "Monocular Localization in Urban Environments using Road Markings", *2017 IEEE Intelligent Vehicles Symposium (IV)*, Jun. 11-14, 2017 (pp. 468-474).

Extended European Search Report dated Nov. 7, 2019 in counterpart European Patent Application No. 19182124.8 (7 pages in English).

* cited by examiner

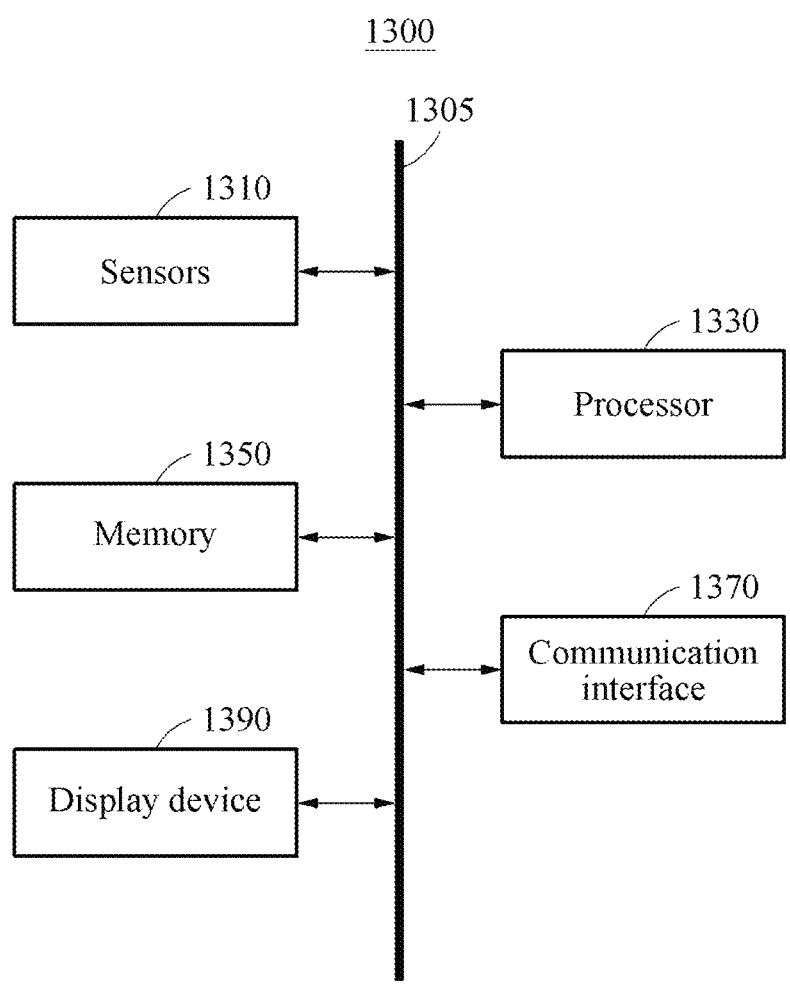

METHOD AND APPARATUS FOR LOCALIZATION BASED ON IMAGES AND MAP DATA

CROSS-REFERENCE TO RELATED APPLICATIONS

This application claims the benefit under 35 USC § 119(a) of Korean Patent Application No. 10-2018-0127589 filed on Oct. 24, 2018 in the Korean Intellectual Property Office, the entire disclosure of which is incorporated herein by reference for all purposes.

BACKGROUND

1. Field

The following description relates to a method and apparatus for localization based on images and map data.

2. Description of Related Art

Various types of augmented reality (AR) services are provided in fields such as driving assistance for vehicles and other means of transportation, games, or entertainment. To provide more accurate and realistic AR, a number of localization methods are used. For example, a sensor-based localization method uses a combination of sensors such as a global positioning system (GPS) sensor and an inertial measurement unit (IMU) sensor to determine a position and an orientation of an object. Further, a vision-based localization method uses camera information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is disclosed a localization method, including generating a first image of an object from an input image, generating a second image to project the object with respect to candidate localization information of a device, based on map data including a position of the object, pooling, from the first image, feature values corresponding to vertices in the second image, and determining a score of the candidate localization information based on the pooled feature values.

The generating of the first image may include generating feature maps corresponding to a plurality of features.

The generating of the second image may include extracting a region corresponding to a field of view in the candidate localization information from the map data, and projecting vertices included in the region into a projection point corresponding to the candidate localization information.

The pooling may include selecting pixels in the first image based on coordinates of the vertices, and obtaining feature values of the selected pixels.

The determining may include determining a sum of the pooled feature values.

The determining of the sum may include, determining a weighted sum of the feature values based on weights determined for the features, in response to the first image may include feature maps corresponding to features.

The localization method may include determining localization information of the device based on the score of the candidate localization information.

The determining of the localization information of the device may include determining candidate localization information corresponding to a highest score, from among scores of a plurality of candidate localization information, to be the localization information of the device.

The determining of the localization information of the device may include segmenting the second image into regions, and sequentially determining a plurality of degree of freedom (DOF) values included in the candidate localization information using scores calculated in the regions.

The plurality of DOF values may include three translational DOF values, and three rotational DOF values.

The segmenting may include segmenting the second image into a long-distance region and a short-distance region based on a first criterion associated with a distance, and segmenting the short-distance region into a vanishing point-oriented short-distance region and a non-vanishing point-oriented short-distance region based on a second criterion associated with a vanishing point.

The sequentially determining may include determining rotational DOFs based on the long-distance region, determining a left and right translational DOF based on the vanishing point-oriented short-distance region, and determining a forward and backward translational DOF based on the non-vanishing point-oriented short-distance region.

The determining may include determining rotational DOFs based on long-distance vertices affected below a first threshold by translational DOFs, from among vertices included in the second image, determining a left and right translational DOF based on vanishing point-oriented short-distance vertices affected below a second threshold by a forward and backward translational DOF, from among short-distance vertices excluding the long-distance vertices from the second image, and determining the forward and backward translational DOF based on non-vanishing point-oriented short-distance vertices excluding the vanishing point-oriented short-distance vertices from the short-distance vertices.

The determining of the localization information of the device may include determining a direction to improve the score based on a distribution of the pooled feature values, and correcting the candidate localization information based on the direction.

The first image may include a probability distribution indicating a degree of closeness to the object, wherein the determining of the direction may include determining the direction based on the probability distribution.

The determining of the localization information of the device may include generating a corrected second image in which the object is projected with respect to the corrected candidate localization information, and determining a corrected score of the corrected candidate localization information by pooling, from the first image, feature values corresponding to vertices in the corrected second image, wherein the determining of the direction, the correcting of the candidate localization information, the generating of the corrected second image, and the calculating of the corrected score are iteratively performed until the corrected score satisfies a condition.

The localization method may include determining a virtual object on the map data to provide an augmented reality (AR) service, and displaying the virtual object based on the determined localization information.

The input image may include a driving image of a vehicle, and the virtual object indicates driving route information.

In another general aspect, there is disclosed a localization method, including generating a first image of an object from an input image, generating a second image to project the object with respect to candidate localization information of a device, based on map data including a position of the object, segmenting the second image into regions, and determining degree of freedom (DOF) values included in the candidate localization information through matching between the first image and the regions.

The determining may include determining the DOF values included in the candidate localization information by sequentially using scores calculated through the matching in the regions.

The determining may include calculating, while changing DOF values determined for the regions, scores corresponding to the changed DOF values by pooling, from the first image, feature values corresponding to vertices in the regions, and selecting a DOF value corresponding to a highest score.

The plurality of DOF values may include three translational DOF values, and three rotational DOF values.

The segmenting may include segmenting the second image into a long-distance region and a short-distance region based on a first criterion associated with a distance, and segmenting the short-distance region into a vanishing point-oriented short-distance region and a non-vanishing point-oriented short-distance region based on a second criterion associated with a vanishing point.

The determining may include determining rotational DOFs based on the long-distance region, determining a left and right translational DOF based on the vanishing point-oriented short-distance region, and determining a forward and backward translational DOF based on the non-vanishing point-oriented short-distance region.

The determining may include determining rotational DOFs based on long-distance vertices affected below a first threshold by translational DOFs, from among vertices included in the second image, determining a left and right translational DOF based on vanishing point-oriented short-distance vertices affected below a second threshold by a forward and backward translational DOF, from among short-distance vertices excluding the long-distance vertices from the second image, and determining the forward and backward translational DOF based on non-vanishing point-oriented short-distance vertices excluding the vanishing point-oriented short-distance vertices from the short-distance vertices.

The localization method may include determining a virtual object on the map data to provide an augmented reality (AR) service, and displaying the virtual object based on the determined DOF values.

The input image may include a driving image of a vehicle, and the virtual object indicates driving route information.

In another general aspect, there is disclosed a localization apparatus, including a processor configured to generate a first image of an object from an input image, generate a second image to project the object with respect to candidate localization information of a device, based on map data including a position of the object, pool, from the first image, feature values corresponding to vertices in the second image, and determine a score of the candidate localization information based on the pooled feature values.

In another general aspect, there is disclosed a localization apparatus, including a processor configured to generate a first image of an object from an input image, generate a second image to project the object with respect to candidate localization information of a device, based on map data including a position of the object, segment the second image into regions, and determine degree of freedom (DOF) values included in the candidate localization information through matching between the first image and the regions.

In another general aspect, there is disclosed a localization apparatus including a sensor disposed on a device, and being configured to sense one or more of an image and candidate localization information of the device, a processor configured to generate a first image of an object from the image, generate a second image to project the object with respect to the candidate localization information, based on map data including a position of the object, determine a score of the candidate localization information based on pooling, from the first image, feature values corresponding to vertices in the second image, and determine localization information of the device based on the score, and a head-up display (HUD) configured to visualize a virtual object on the map data based on the determined localization information.

The processor may be configured to segment the second image into a long-distance region and a short-distance region based on a distance, and segment the short-distance region into a vanishing point-oriented short-distance region and a non-vanishing point-oriented short-distance region based on a vanishing point.

The processor may be configured to determine rotational degree of freedom (DOF) values based on the long-distance region, determine a left and right translational DOF based on the vanishing point-oriented short-distance region, and determine a forward and backward translational DOF based on the non-vanishing point-oriented short-distance region.

The processor may be configured to generate, using a neural network, the first image may include feature maps corresponding to a plurality of features.

The second image may include a projection of two-dimensional (2D) vertices corresponding to the object.

The localization apparatus may include a memory configured to store the map data, the image, the first image, the second image, the score, and instructions that, when executed, configures the processor to determine any one or any combination of the determined localization information and the virtual object.

Other features and aspects will be apparent from the following detailed description, the drawings, and the claims.

BRIEF DESCRIPTION OF THE DRAWINGS

FIG. 13 illustrates an example of a localization apparatus.

Figure 1A:
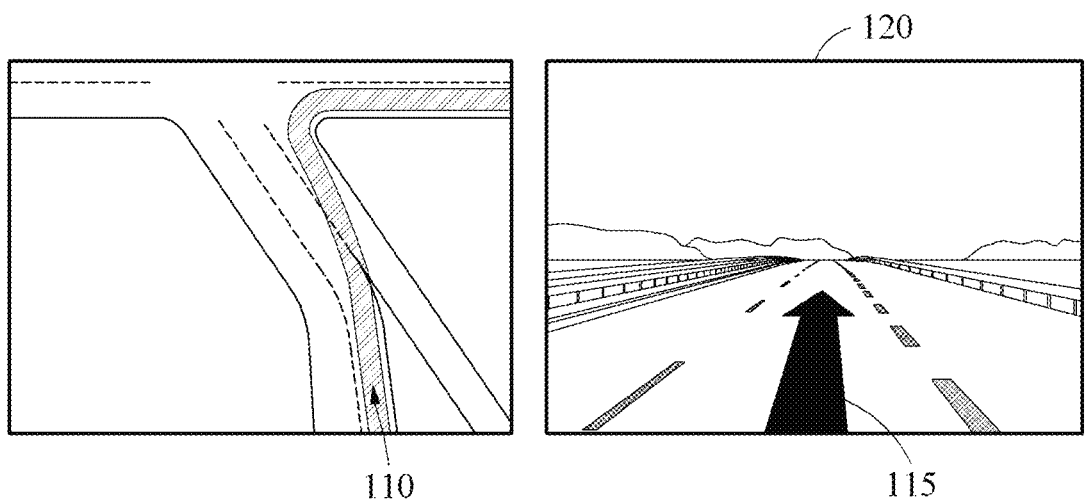
FIGS. 1A through 1C illustrate examples of significance of localization accuracy in an augmented reality (AR) application.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

The examples set forth hereinafter may be implemented on hardware that is applied to technology for localization based on images and map data. For example, the examples may be used to improve an accuracy of localization in an augmented reality head-up display (AR HUD). Further, the localization is needed for a number of location-based services in addition to the HUD, and the examples may be used to estimate a position and an orientation in an environment in which high density (HD) map data is provided for high-precision localization.

Hereinafter, examples will be described in detail with reference to the accompanying drawings. In the drawings, like reference numerals are used for like elements.

Figure 1B:
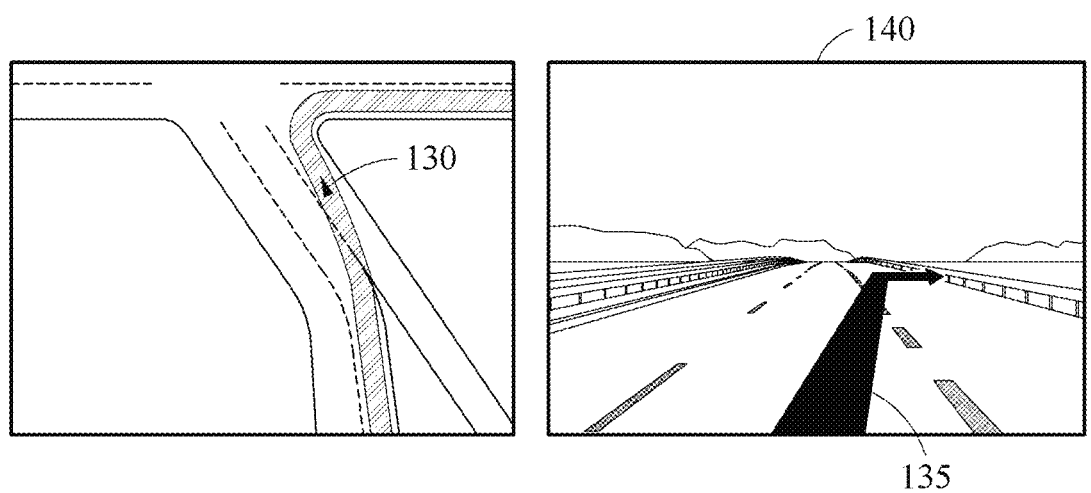
Figure 1C:
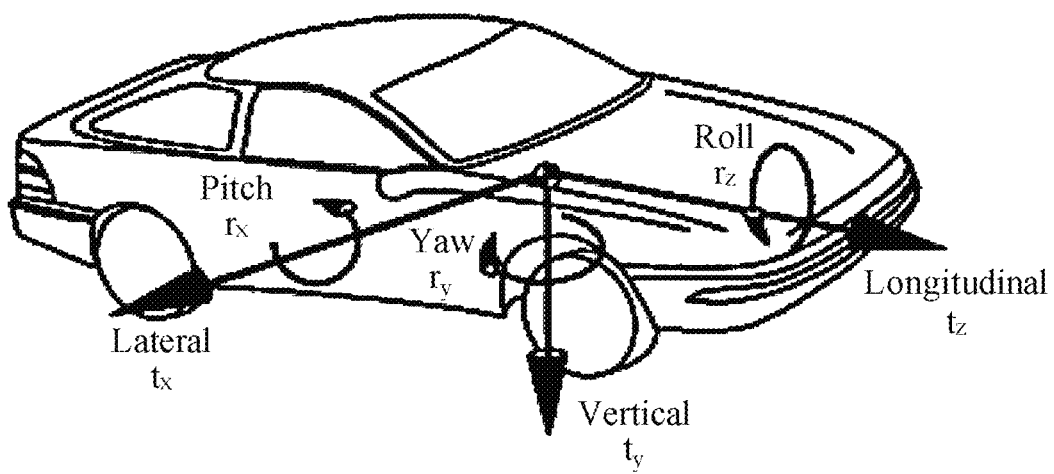

FIGS. 1A through 1C illustrate examples of significance of localization accuracy in an AR application.

Referring to FIGS. 1A through 1C, in an example, AR adds or augments information based on reality and provides the added or augmented information. For example, AR adds a virtual object corresponding to a virtual image to a background image or an image of a real world and represents the image with the added object. AR appropriately combines a virtual world with the real world such that a user experiences an immersive experience when interacting with the virtual world in real time without recognizing a separation between real and virtual environments. To match a virtual object to a real image, a position and an orientation, i.e., localization information, of a user device or the user which provides AR, needs to be determined.

Localization information for providing AR is used to dispose a virtual object at a desired position in an image. Hereinafter, for ease of description, an example of a driving guidance lane corresponding to a virtual object is displayed on a road surface. However, examples are not limited thereto.

FIG. 1A illustrates an AR image 120 having a relatively small localization error. FIG. 1B illustrates an AR image 140 having a relatively great localization error.

For example, a reference route of a vehicle is displayed on a road image based on localization information of an object 110. In an example, the object corresponds to a vehicle and/or a user terminal which performs localization. When the localization information of the object 110 includes error within a small tolerance range, a driving guidance lane 115 that is a virtual object to be displayed by a device is visually appropriately aligned with a real road image, as shown in the image 120. When localization information of an object 130 includes a relatively greater error, i.e., outside the tolerance range, a driving guidance lane 135 that is a virtual object to be displayed by the device is not visually appropriately aligned with a real road image, as shown in the image 140.

Referring to FIG. 1C, localization information includes a position and an orientation of the device. The position corresponds to three-dimensional (3D) coordinates such as lateral ($t_x$), vertical ($t_y$), and longitudinal ($t_z$), i.e., (x, y, z), as translational degrees of freedom (DOFs). Further, the orientation corresponds to pitch ($r_x$), yaw ($r_y$), and roll ($r_z$) as rotational DOFs. The position is obtained through, for example, a global positioning system (GPS) sensor and a light detection and ranging (LiDAR), and the orientation is obtained through, for example, an inertial measurement unit (IMU) sensor and a gyro sensor. The localization information is construed as having 6 DOFs including the position and the orientation.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, an intelligent vehicle with an advanced driver assistance system (ADAS), or a drone. In an example, the smart mobility device includes mobility devices such as, for example, electric wheels, electric kickboard, and electric bike. In an example, vehicles include motorized and non-motorized vehicles, for example, a vehicle with a power engine (for example, a cultivator or a motorcycle), a bicycle or a handcart.

In addition to the vehicle described herein, methods and apparatuses described herein may be included in various other devices, such as, for example, a smart phone, a walking assistance device, a wearable device, a security device, a robot, a mobile terminal, and various Internet of Things (IoT) devices.

The term "road" is a thoroughfare, route, or connection, between two places that has been improved to allow travel by foot or some form of conveyance, such as a vehicle. A road can include various types of roads refers to a way on which vehicles drive, and includes various types of roads such as, for example, a highway, a national road, a local road, an expressway, farm roads, local roads, high-speed national roads, and a motorway. The road includes one or more lanes.

The term "lane" refers to a road space distinguished by lines marked on a surface of the road. The lane is distinguished by left and right lines or lane boundary lines thereof. Further, the lines are various types of lines, for example, solid lines, broken lines, curved lines, and zigzag lines marked in colors such as white, blue, and yellow on the surface of the road. A line corresponds to one line separating a single lane, or corresponds to a pair of lines separating a single lane, that is, left and right lines corresponding to lane boundary lines. The term "lane boundary" may be interchangeably used with the term "lane marking"

The methods and apparatuses described herein are used to road guidance information in a navigation device of a vehicle, such as, for example, an augmented reality head-up display (AR 3D HUD), and an autonomous vehicle. The examples set forth hereinafter may be utilized to display lines in an AR navigation system of a smart vehicle, generate visual information to assist steering of an autonomous vehicle, or provide a variety of control information related to driving of a vehicle. Further, the examples are used to assist safe and pleasant driving by providing visual information to a device including an intelligent system such as an HUD installed on a vehicle for driving assistance or fully autonomous driving. In an example, the examples described herein may also be used to interpret visual information for an intelligent system installed for fully autonomous driving or driving assistance in a vehicle, and used to assist safe and comfortable driving. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling, a smartphone, or a mobile device. The examples related to displaying a road guidance information for vehicles is provided as an example only, and other examples such as, for example, training, gaming, applications in healthcare, public safety, tourism, and marketing are considered to be well within the scope of the present disclosure.

Figure 2:
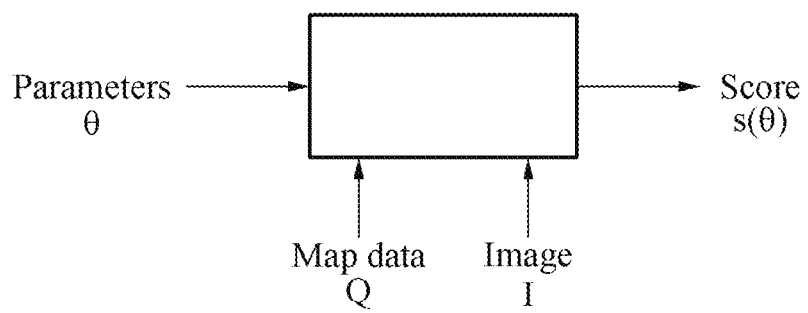
FIG. 2 illustrates an example of calculating a localization score.

FIG. 2 illustrates an example of calculating a localization score.

Referring to FIG. 2, a localization apparatus calculates a score $s(\theta)$ of localization parameters $\theta$ based on map data Q and an image I. The localization apparatus may be implemented by one or more hardware modules.

In an example, the map data is a point cloud including a plurality of 3D vertices corresponding to object(s), such as lines. The 3D vertices of the map data are projected onto two-dimensional (2D) vertices based on localization parameters. The features of the image include feature values extracted on a basis of pixels included in the image. Thus, for the examples described herein, a correspondence between vertices of the map data and features of the image may not be needed.

Information related to a correspondence or matching between the vertices, for example, 2D vertices of the map data and the features or pixels of the image, may not be needed for the examples described herein. Further, because the features extracted from the image may not be parameterized, a separate analysis on a relation between the features or a search of the map data may not be needed.

The localization parameters $\theta$ are position/orientation information parameters, and are defined as 6-DOF variables described in FIG. 1C. The localization parameters $\theta$ correspond to approximate position/orientation information. The localization apparatus improves a localization accuracy by correcting the localization parameters $\theta$ using scoring technology based on the image and the map data.

In an example, the localization apparatus configures a feature map by extracting features from the image I. The localization apparatus calculates a matching score with respect to the localization parameters $\theta$. In detail, the localization apparatus calculates the matching score by projecting vertices from the map data Q based on the localization parameters and pooling feature values of pixels corresponding to 2D coordinates of the projected vertices, among pixels of the feature map. The localization apparatus updates the localization parameters $\theta$ to increase the matching score.

In an example, the device is any device that performs a localization method, and includes devices, such as, for example, a vehicle, a navigation system, or a user device such as a smart phone. Localization information has 6 DOFs including the position and the orientation of the device, as described above. The localization information is obtained based on outputs of sensors such as, for example, an IMU sensor, a GPS sensor, a lidar sensor, and a radio detection and ranging (radar).

The input image is a background image or other images to be displayed along with a virtual object to provide an AR service. The input image includes, for example, a driving image of the vehicle. In an example, the driving image is a driving image acquired using a capturing device mounted on the vehicle, and includes one or more frames.

The localization apparatus acquires the input image based on an output of the capturing device. The capturing device is fixed to a location on the vehicle such as, for example, a windshield, a dashboard, or a rear-view mirror of the vehicle, to capture driving images of a view in front of the vehicle. The capturing device includes, for example, a vision sensor, an image sensor, or a device that performs a similar function. Depending on examples, the capturing device captures a single image, or captures images for each frame. In an example, images that are captured by a device other than the capturing device that is fixed to the vehicle are also used as the driving images. An object includes, for example, a line, a road surface marking, a traffic light, a traffic sign, a curb, a pedestrian, and a structure. The line includes lines such as, for example, a lane boundary line, a road center line, and a stop line. The road surface marking includes markings such as, for example, a no parking marking, a crosswalk marking, a towaway zone marking, and a speed limit marking.

In an example, the map data is high density (HD) map data. An HD map is a 3D map with a high density, for example, a centimeter-level density, that may be used for autonomous driving. The HD map includes, for example, line information related to a road center line and a boundary line, and information related to a traffic light, a traffic sign, a curb, a road surface marking, and various structures in a form of 3D digital data. The HD map is established by, for example, a mobile mapping system (MMS). The MMS, a 3D space information investigation system equipped with various sensors, obtains minute position information using a moving object equipped with sensors such as a camera, a lidar, and a GPS to measure a position and geographic features.

Figure 3:
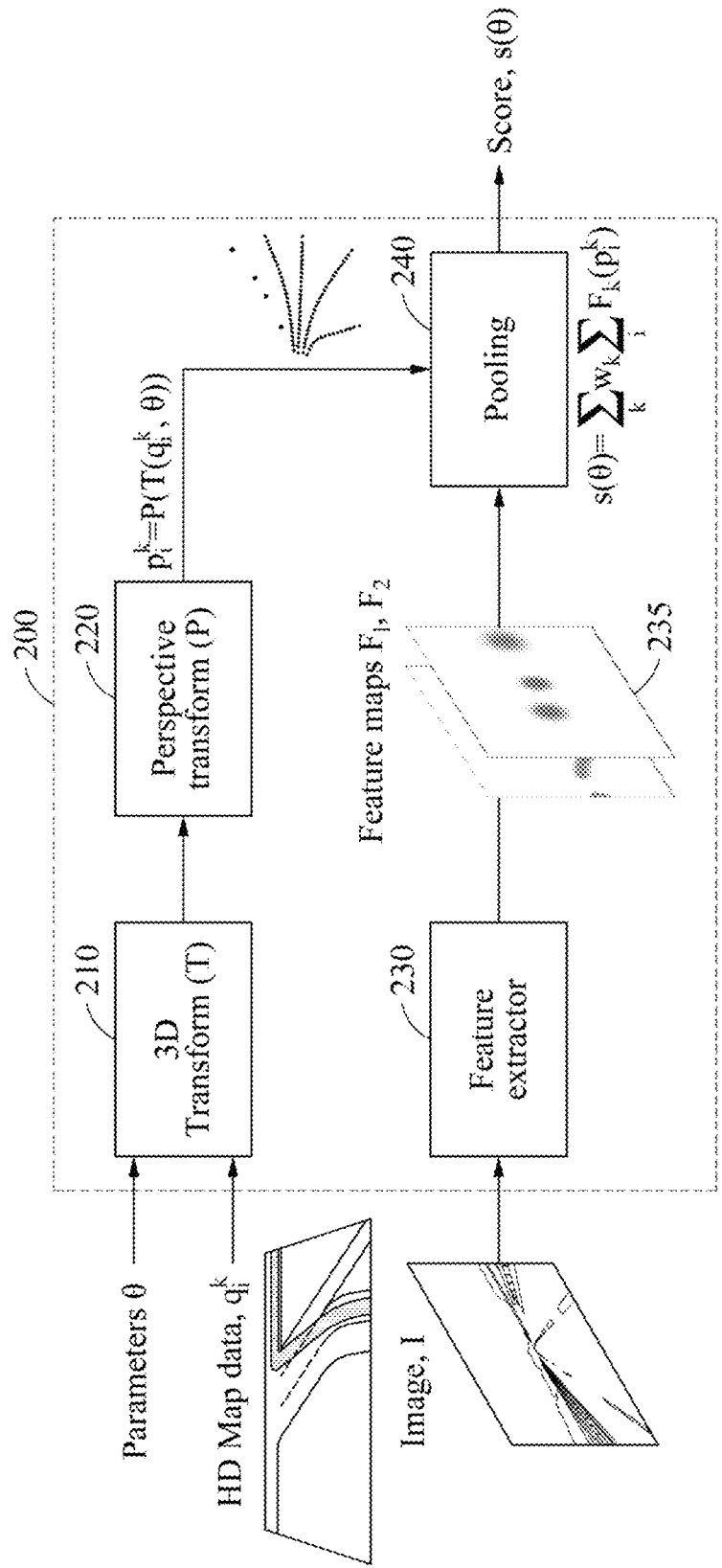
FIG. 3 illustrates an example of calculating a localization score.

FIG. 3 illustrates an example of calculating a localization score.

Referring to FIG. 3, a localization apparatus 200 includes transform devices 210 and 220, a feature extractor 230, and a pooler 240. In an example, the transform device 210 receives parameters θ and map data Q, and applies a 3D position and a 3D orientation of a device corresponding to the parameters θ to the map data Q through a 3D transform T. For example, the transform device 210 extracts a region corresponding to a range of view at the position and the orientation corresponding to the parameters θ from the map data. In an example, the transform device 220 generates a projection image at a viewpoint of the device through a perspective transform P. For example, the transform device 220 projects 3D vertices included in the region extracted by the transform device 210 onto a 2D projection plane corresponding to the parameters θ. In this example, 3D vertices $q_i^k$ included in the map data Q are transformed to 2D vertices $p_i^k$ in the projection image through the transform T and the transform P based on the parameters θ. Here, k denotes an index indicating a different feature or class, and i denotes an index indicating a vertex in the corresponding feature or class.

The feature extractor 230 extracts a feature from the image I. The feature includes one or more feature maps $F_1$ and $F_2$ 235 depending on a type or class of an object. For example, the feature map $F_1$ includes features related to lines in the image, and the feature map $F_2$ includes features related to traffic signs in the image. For ease of description, an example in which two feature maps $F_1$ and $F_2$ 235 are extracted is described. However, examples are not limited thereto.

In an example, The localization apparatus includes separate feature extractors to extract a plurality of feature maps. In another example, the localization apparatus includes a single feature extractor, for example, a deep neural network (DNN), to output a plurality of feature maps for each channel.

The extracted feature maps $F_1$ and $F_2$ 235 may include errors in some examples, and thus may not accurately specify values of corresponding features on a pixel basis. In this example, each feature map has a value between "0" and "1" for each pixel. A feature value of a pixel indicates an intensity of the pixel with respect to the feature.

The 2D vertices $p_i^k$ of the projection image refer to pixels corresponding to the 3D vertices $q_i^k$ of the map data mapped to the image I. Referring to Equation 1, scores of features of the pixels mapped to the image I are summed up.

$$s_k(\theta) = \sum_i F_k(P(T(q_i^k, \theta))) \qquad \text{[Equation 1]}$$

In Equation 1, T( ) denotes the transform T, and P( ) denotes the transform P. In this example, $P(T(q_i^k, \theta))$ denotes a mapping point, and $F_k( )$ denotes a feature value or score by a mapping point in a feature map corresponding to a k-th feature or class. In this example, if the mapping point $P(T(q_i^k, \theta))$ is not an integer, an operation such as rounding off or interpolation is performed. Referring to Equation 2, a final score is calculated by calculating a weighted sum of the scores of the features.

$$s(\theta) = \sum_k w_k s_k(\theta) \qquad \text{[Equation 2]}$$

In this example, a weight $w_k$ is set using an arbitrary scheme. For example, the weight $w_k$ is set to be a weight assigned equally in the lump or a value tuned by training data.

Figure 4:
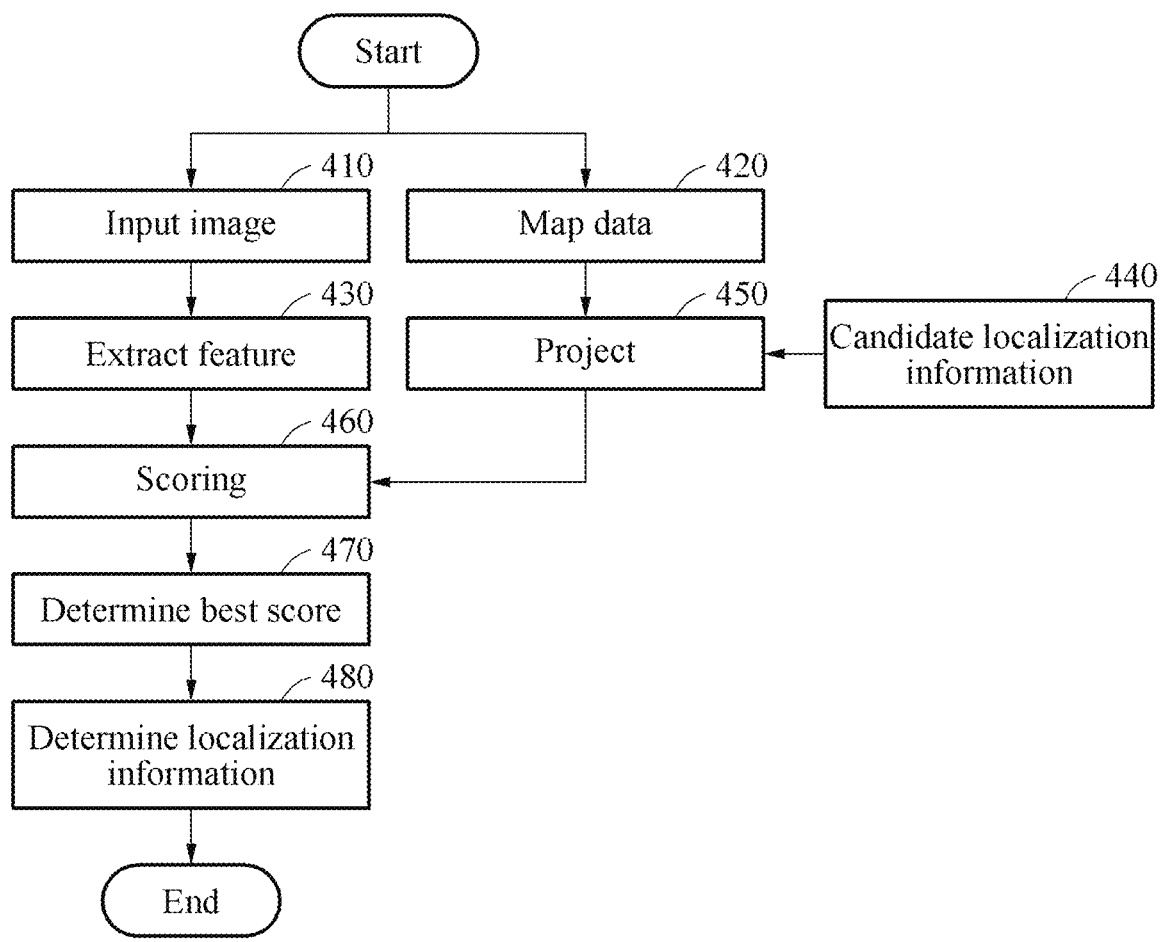
FIG. 4 illustrates an example of determining localization information of a device by utilizing a localization score.

FIG. 4 illustrates an example of determining localization information of a device by utilizing a localization score. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIG. 1-3 are also applicable to FIG. 4, and are incorporated herein by reference. Thus, the above description may not be repeated here.

Referring to FIG. 4, in operation 410, an input image is received. In operation 430, features are extracted. In operation 420, map data is obtained. In operation 440, candidate localization information is obtained. In an example, the candidate localization information includes a plurality of pieces of candidate localization information.

In operation 450, a projection image of the map data with respect to the candidate localization information is generated. In an example, when a plurality of pieces of candidate localization information is provided, a plurality of projection images with respect to the plurality of pieces of candidate localization information is generated.

In operation 460, feature values corresponding to 2D vertices in the projection image are pooled from the feature map. Further, in operation 460, a score of the candidate localization information is calculated based on the pooled feature values. When a plurality of pieces of candidate localization information is provided, scores of the pieces of candidate localization information are calculated.

In operation 470, a best score, for example, a highest score, is determined. In operation 480, candidate localization information having the determined best score is determined to be localization information of a device.

Although not shown in the drawings, the localization apparatus 200 determines a virtual object on the map data Q to provide an AR service. For example, the virtual object indicates driving route information, and is represented in a form of an arrow or a road marking indicating a direction to travel. The localization apparatus displays the virtual object along with the input image on a display of a user device, a navigation system, or a HUD, based on the localization information determined in operation 480.

Figure 5:
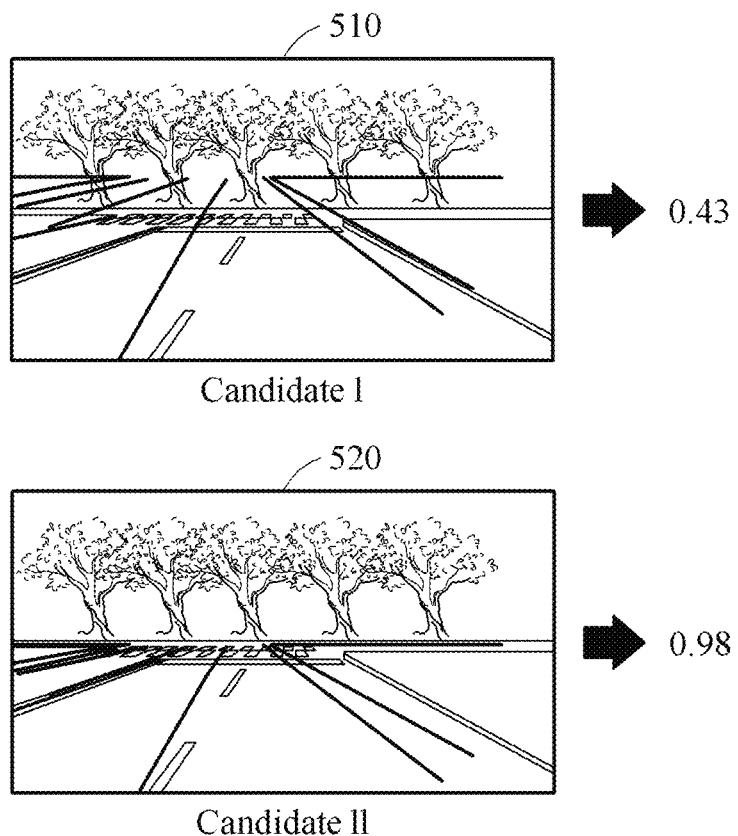
FIG. 5 illustrates an example of scores of pieces of candidate localization information.

FIG. 5 illustrates an example of scores of pieces of candidate localization information.

Referring to FIG. 5, a degree of visual alignment between an image 510 and a projection image with respect to first candidate localization information is lower than a degree of visual alignment between an image 520 and a projection image with respect to second candidate localization information. Accordingly, a score pooled from a feature map of the image 510 based on the first candidate localization information is calculated to be lower than a score pooled from a feature map of the image 520 based on the second candidate localization information.

Figure 6:
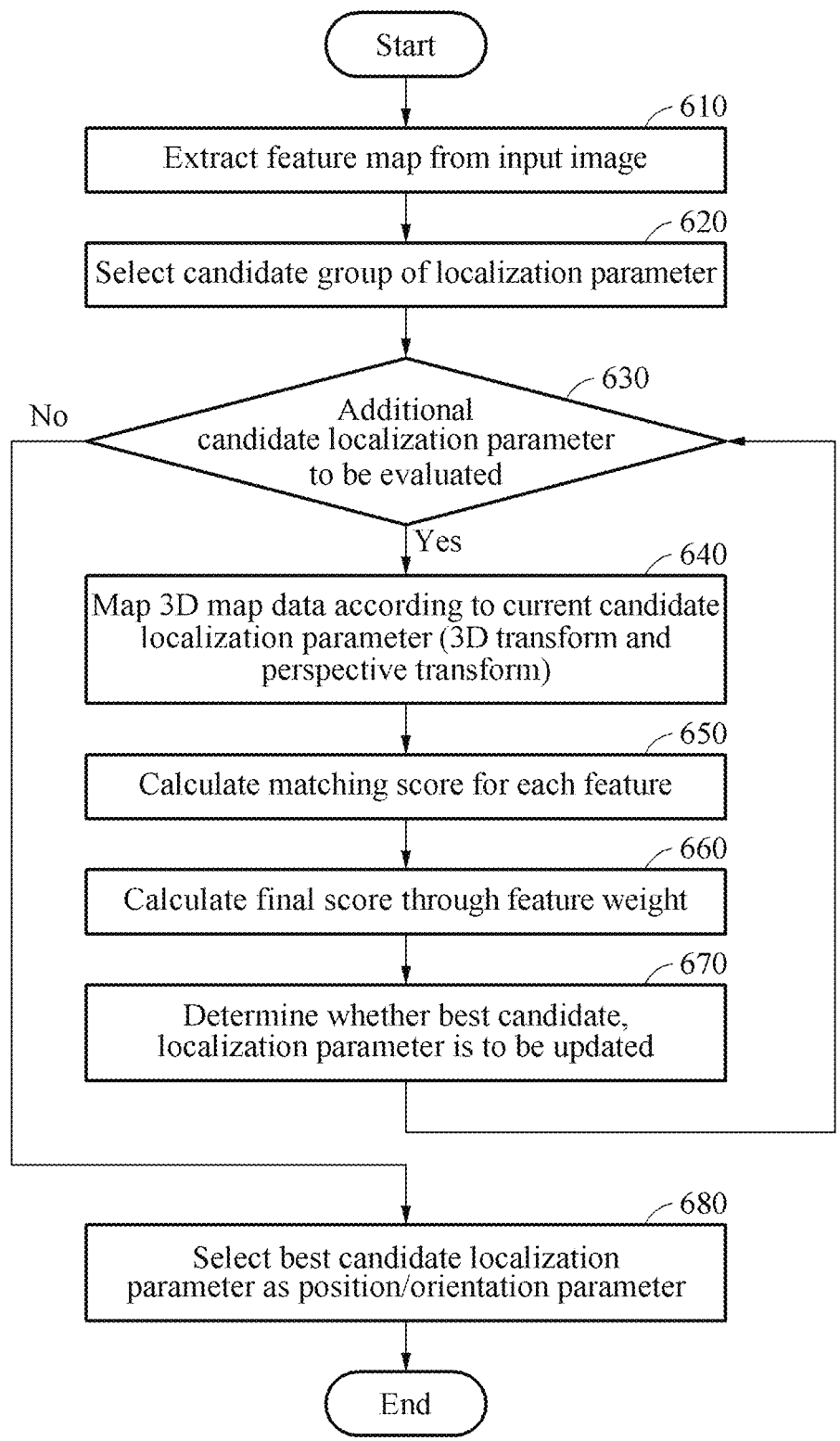
FIG. 6 illustrates an example of a localization method.

FIG. 6 illustrates an example of a localization method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIG. 1-5 are also applicable to FIG. 6, and are incorporated herein by reference. Thus, the above description may not be repeated here.

Referring to FIG. 6, in operation 610, at least one feature map is extracted from an input image. In operation 620, a candidate group of localization parameters, for example, position/orientation parameters, is selected. In operation 630, a determination is made whether additional candidate localization information is to be evaluated. In operation 640, when it is determined that candidate localization information to be evaluated exists, a projection image corresponding to the candidate localization information is generated. In operation 650, scores of features are calculated. In operation 660, a final score is calculated through a weighted sum of the scores of the features. In operation 670, a determination is made whether the best candidate localization information is to be updated. In an example, the determination of the best candidate localization information is made by comparing the previous best candidate localization information, from among pieces of evaluated candidate localization information, to the final score.

When no further candidate localization information to be evaluated exists, in operation 680, the best candidate localization information, from among the pieces of evaluated candidate localization information, is determined to be localization information of a device. In this example, parameters of the best candidate localization information are determined to be position/orientation parameters of the device.

Figure 7:
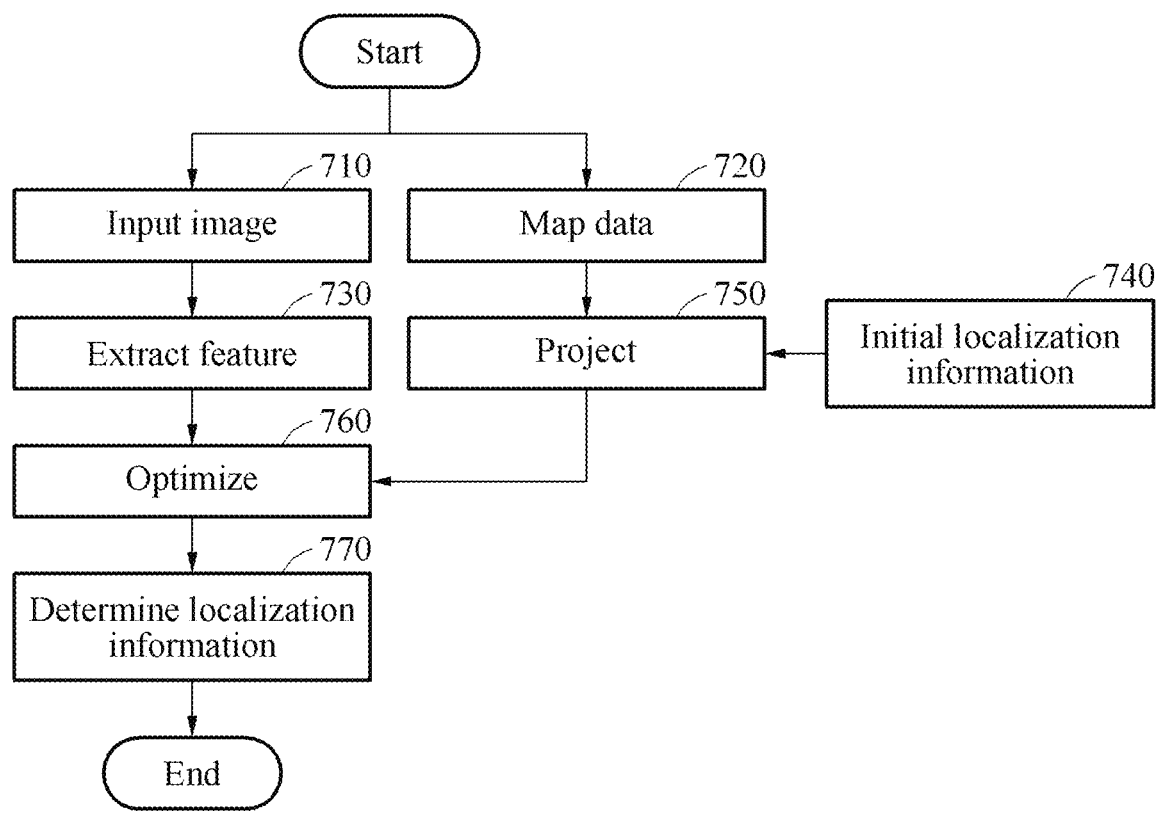
FIG. 7 illustrates an example of determining localization information of a device through an optimization technique.

FIG. 7 illustrates an example of determining localization information of a device through an optimization technique. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIG. 1-6 are also applicable to FIG. 7, and are incorporated herein by reference. Thus, the above description may not be repeated here.

Referring to FIG. 7, in operation 710, an input image is received. In operation 730, a feature map is extracted. In operation 720, map data is received. In operation 740, initial localization information is received. In operation 750, a projection image with respect to the initial localization information is generated.

In operation 760, the initial localization information is updated through an optimization technique. In operation 770, localization information of a device is determined to be the optimized localization information.

Hereinafter, the optimization technique of operation 760 will be described in detail.

Figure 8A:
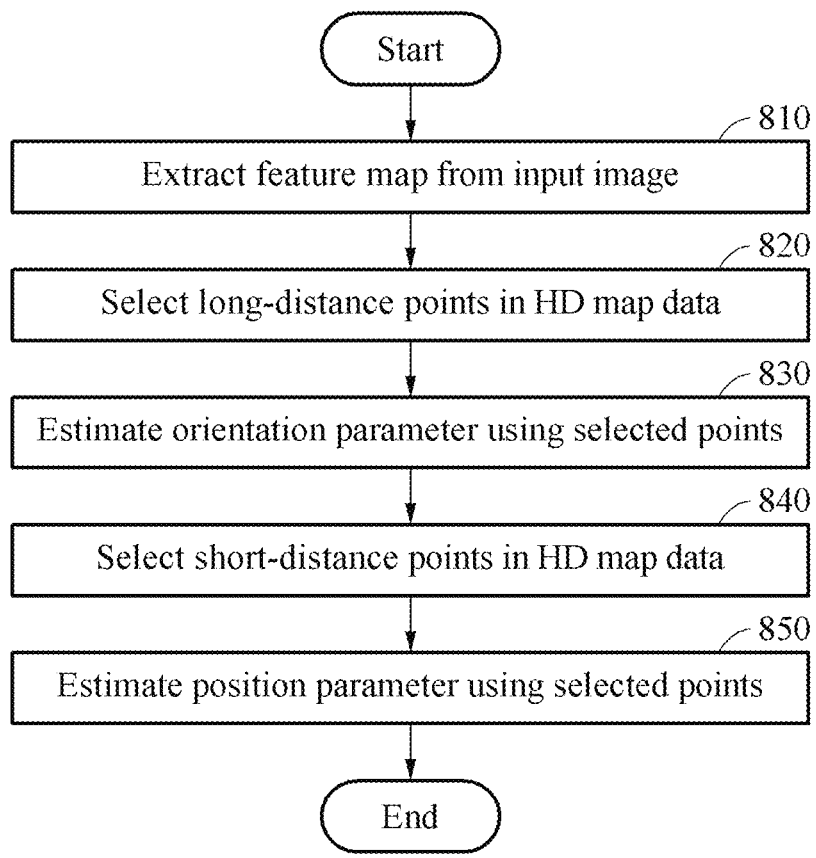
FIGS. 8A and 8B illustrate examples of optimization technique.
Figure 8B:
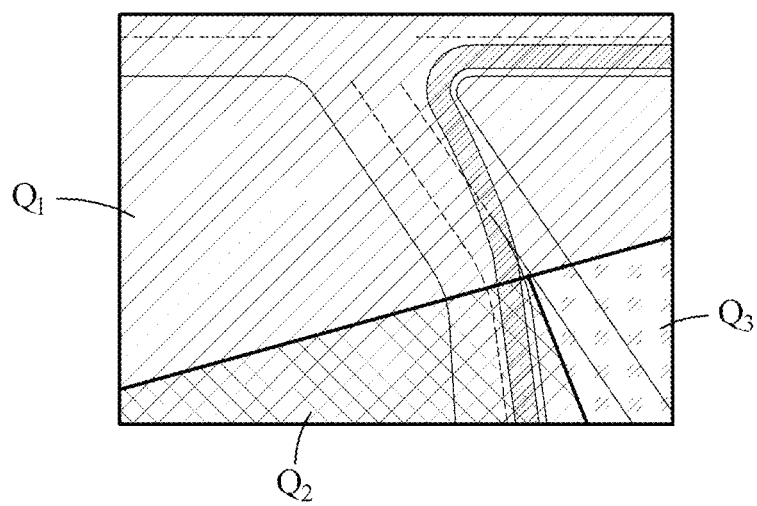

FIGS. 8A and 8B illustrate an example of an optimization technique. The operations in FIG. 8A may be performed in the sequence and manner as shown, although the order of some operations may be changed or some of the operations omitted without departing from the spirit and scope of the illustrative examples described. Many of the operations shown in FIG. 8A may be performed in parallel or concurrently. One or more blocks of FIG. 8A, and combinations of the blocks, can be implemented by special purpose hardware-based computer, such as a processor, that perform the specified functions, or combinations of special purpose hardware and computer instructions. In addition to the description of FIG. 8A below, the descriptions of FIG. 1-7 are also applicable to FIG. 8A, and are incorporated herein by reference. Thus, the above description may not be repeated here.

A localization apparatus supports a global optimization process. The localization apparatus classifies 2D vertices projected from map data by a criterion other than features, for example, a distance, or whether a region is vanishing point-oriented, and uses the classified 2D vertices to estimate different DOFs of localization parameters.

In an example, the localization apparatus segments a projection image into a plurality of regions, and determines localization information of a device through matching between a feature map and the regions. In detail, the localization apparatus sequentially determines a plurality of DOF values included in the localization information by sequentially using scores calculated through the matching in the regions. For example, the localization apparatus calculates pools, from the feature map, feature values corresponding to the 2D vertices included in the regions while changing DOF values determined for the regions. The localization apparatus calculates scores corresponding to the changed DOF values based on the pooled feature values. In an example, the localization apparatus determines a DOF to be a value corresponding to a highest score.

The distant vertices in the projection image have a characteristic of being practically invariant to a change in position parameter. Based on such a characteristic, the localization apparatus separately performs a process of determining an orientation parameter by calculating a score using long-distance vertices and a process of determining a position parameter by calculating a score using short-distance vertices. This reduces DOFs to be estimated for each process, and thus a search complexity or a local convergence possibility during optimization decreases.

In an example, the localization apparatus segments the projection image into a long-distance region and a short-distance region based on a first criterion associated with a distance, and segments the short-distance region into a vanishing point-oriented short-distance region and a non-vanishing point-oriented short-distance region based on a second criterion associated with a vanishing point, which will be described further below. Here, the long-distance region includes 2D vertices that are affected below a threshold by translational DOFs. The vanishing point-oriented short-distance region includes 2D vertices whose influence due to the movement-related DOF in the forward and backward direction, or forward and backward translational DOF, is less than a threshold.

In an example, the localization apparatus uses a portion of the DOFs of the localization parameters as values determined by advance calibration. Further, in an example, $r_z$ and $t_y$ of the localization parameters are determined by advance calibration because the height $t_y$ and the roll $r_z$ at which a camera is installed on a vehicle are fixed.

Referring to FIGS. 8A and 8B, in operation 810, a feature map is extracted from an input image. In operation 820, long-distance vertices Q1 are selected from a projection image of map data. The long-distance vertices Q1 are not substantially affected by translational DOFs $t_x$ and $t_z$ from among the DOFs of the localization parameters. Thus, in operation 830, rotational DOFs $r_x$ and $r_y$ are determined based on the long-distance vertices Q1. The rotational DOFs $r_x$ and $r_y$ are referred to as orientation parameters.

In an example, the localization apparatus performs a parallel translation of the long-distance vertices Q1 in a longitudinal direction while changing $r_x$, and performs a parallel translation of the long-distance vertices Q1 in a transverse direction while changing $r_y$. The localization apparatus searches for values of $r_x$ and $r_y$ which make a score calculated for the long-distance vertices Q1 to be greater than or equal to a target value.

In operation 840, short-distance vertices are selected from the map data. The short-distance vertices are selected based on $r_z$ and $t_y$ being determined by the advance calibration and $r_x$ and $r_y$ being determined by the long-distance vertices Q1.

The localization apparatus selects vertices Q2 corresponding to lines towards the vanishing points from among the short-distance vertices, and selects the other vertices Q3. The vertices Q2 are not substantially affected by the forward and backward (movement-related) translational DOF $t_z$ from among the DOFs of the localization parameters. Thus, in operation 850, the translational DOF $t_x$ is determined based on the vertices Q2. Further, the translational DOF $t_z$ is determined based on the vertices Q3. The translational DOFs $t_x$ and $t_z$ are referred to as position parameters.

FIGS. 9A through 9E illustrate an example of a result of applying an optimization technique.

Figure 9A:
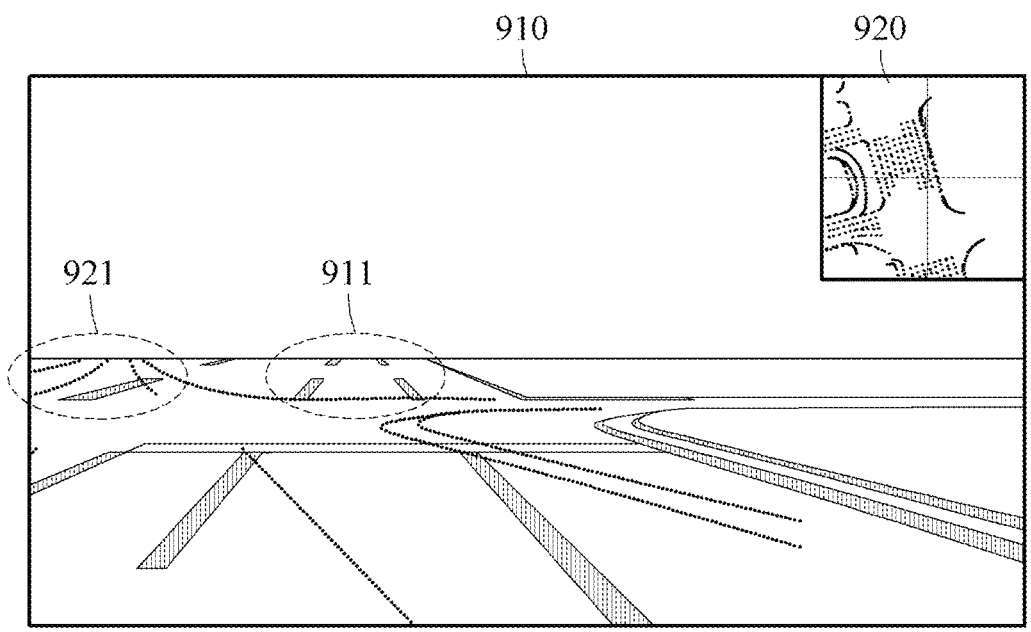
FIGS. 9A through 9E illustrate examples of a result of applying an optimization technique.

Features 911 extracted from a feature map 910 and vertices 921 projected from map data 920 are illustrated in FIG. 9A. Initial localization information on the map data 920 is inaccurate, and thus, the features 911 and the vertices 921 do not match. Hereinafter, a process of sequentially determining DOFs of localization parameters to match the features 911 and the vertices 921 will be described.

Considering that a camera installed on a vehicle has a relatively constant height and a relatively constant roll relative to a road surface, $t_y$ and $r_z$ are calibrated in advance.

Figure 9B:
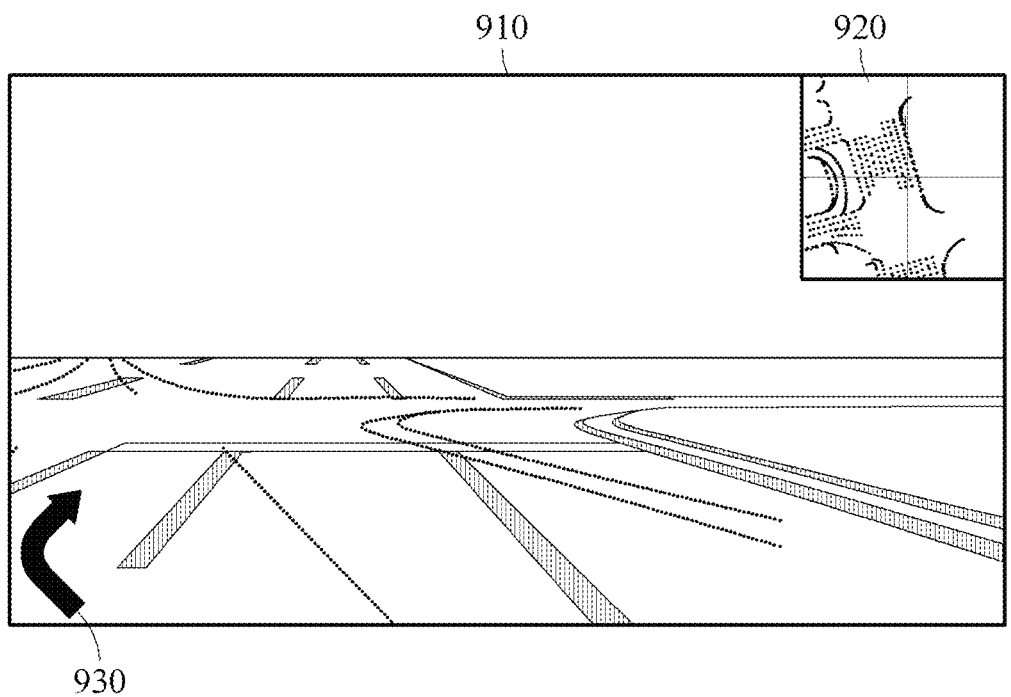

Referring to FIG. 9B, a localization apparatus removes a roll effect from the feature map 910 and the map data 920. In 930, the localization apparatus removes the roll effect from the feature map 910 by rotating the feature map 910 based on $r_z$ that is calibrated in advance. Further, the localization apparatus detects vertices in the vicinity of the initial localization information from the map data 920, approximates the detected vertices to a plane, and rotates the map data 920 to remove a roll of the plane.

Further, the localization apparatus corrects heights of the vertices of the map data 920 using $t_y$ that is calibrated in advance.

Figure 9C:
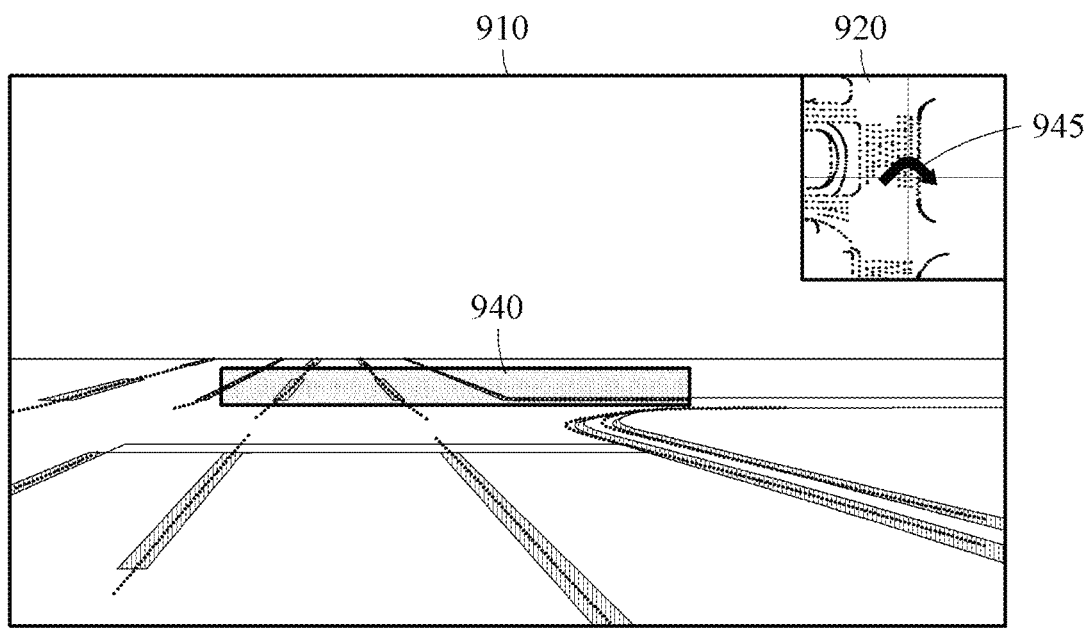

Referring to FIG. 9C, the localization apparatus deduces $r_x$ and $r_y$ corresponding to a parallel translation using long-distance vertices 940 in a projection image of map data based on initial localization information. In an example, the localization apparatus performs a parallel translation of the long-distance vertices 940 such that a correlation between the long-distance vertices 940 and the feature map 910 is greater than or equal to a target value. For example, by rotating the vertices on the map data 920 through an adjustment of $r_x$ as in 945, the long-distance vertices 940 in the projection image may be matched well with the features of the feature map 910.

Figure 9D:
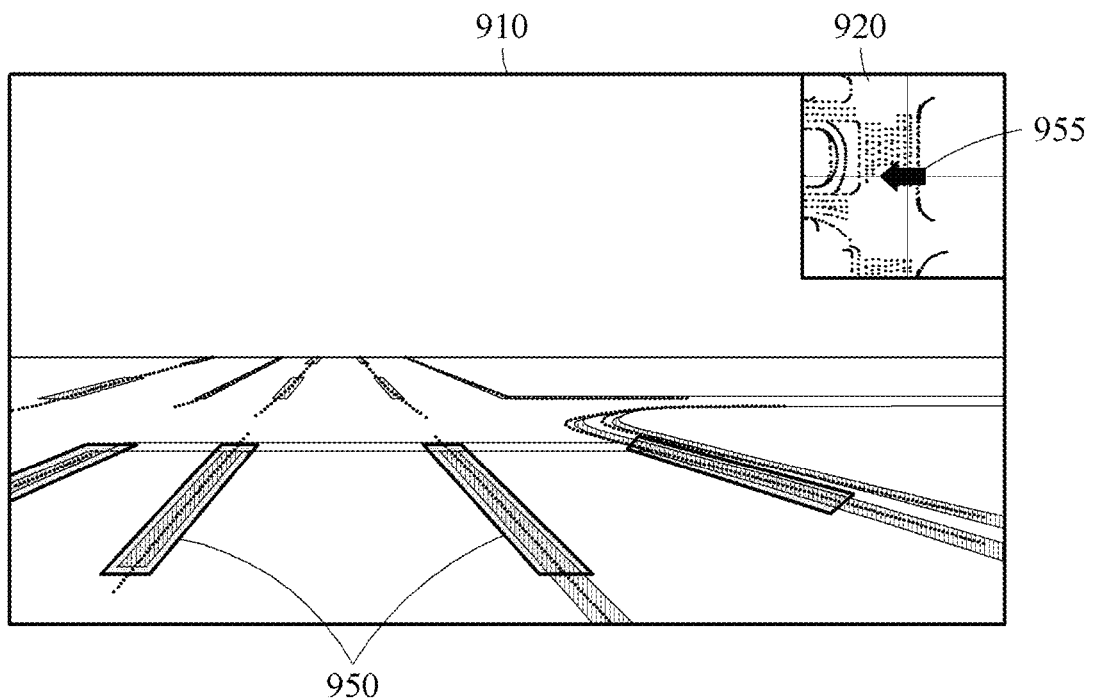

Referring to FIG. 9D, the localization apparatus obtains a vanishing point of neighboring lines 950 by analyzing the vertices in the projection image. The localization apparatus aligns the vanishing point of the neighboring lines 950 at a position in the feature map 910, for example, a center of a feature map. In this example, the neighboring lines have a characteristic of being invariant to a z-directional translation. The localization apparatus moves vertices corresponding to the neighboring lines 950 in the x direction such that a correlation between the neighboring lines 950 and the feature map 910 is greater than or equal to a target value. For example, by moving the vertices on the map data 920 through an adjustment of $t_x$ as in 955, vertices corresponding to the neighboring lines 950 in the projection image may be matched well with the features of the feature map 910.

Figure 9E:
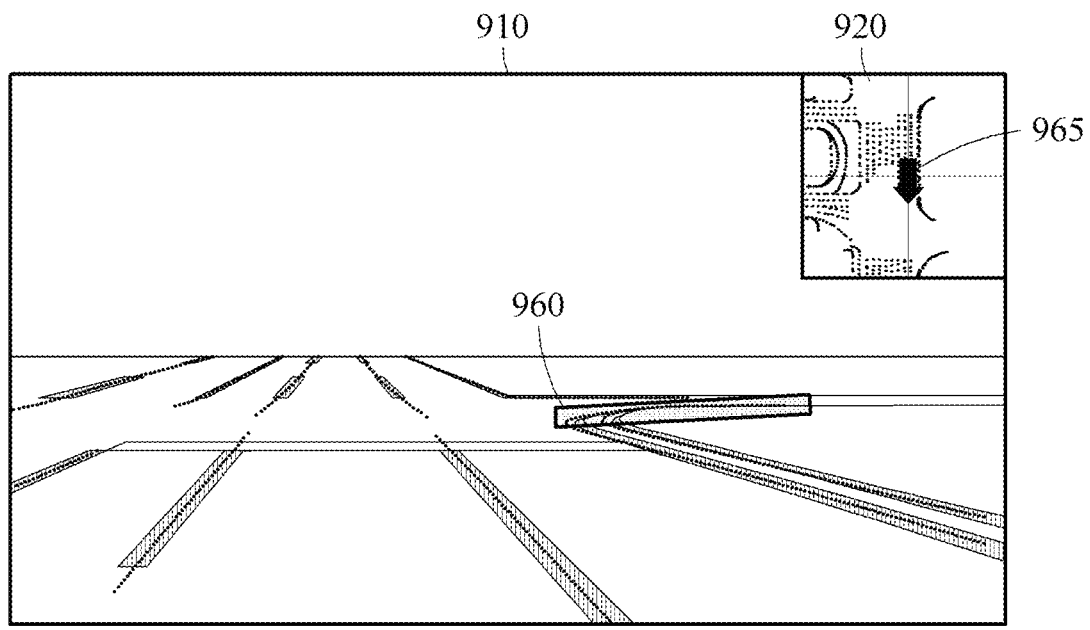

Referring to FIG. 9E, the localization apparatus detects a z-directional translation using remaining vertices 960 excluding vanishing point-directional lanes from among short-distance vertices in the projection image. The localization apparatus moves the remaining vertices 960 in the z direction such that a correlation between the remaining vertices 960 and the feature map 910 is greater than or equal to a target value. For example, by moving the vertices on the map data 920 through an adjustment of $t_z$ as in 965, the remaining vertices 960 in the projection image may be matched well with the features of the feature map 910.

Figure 10:
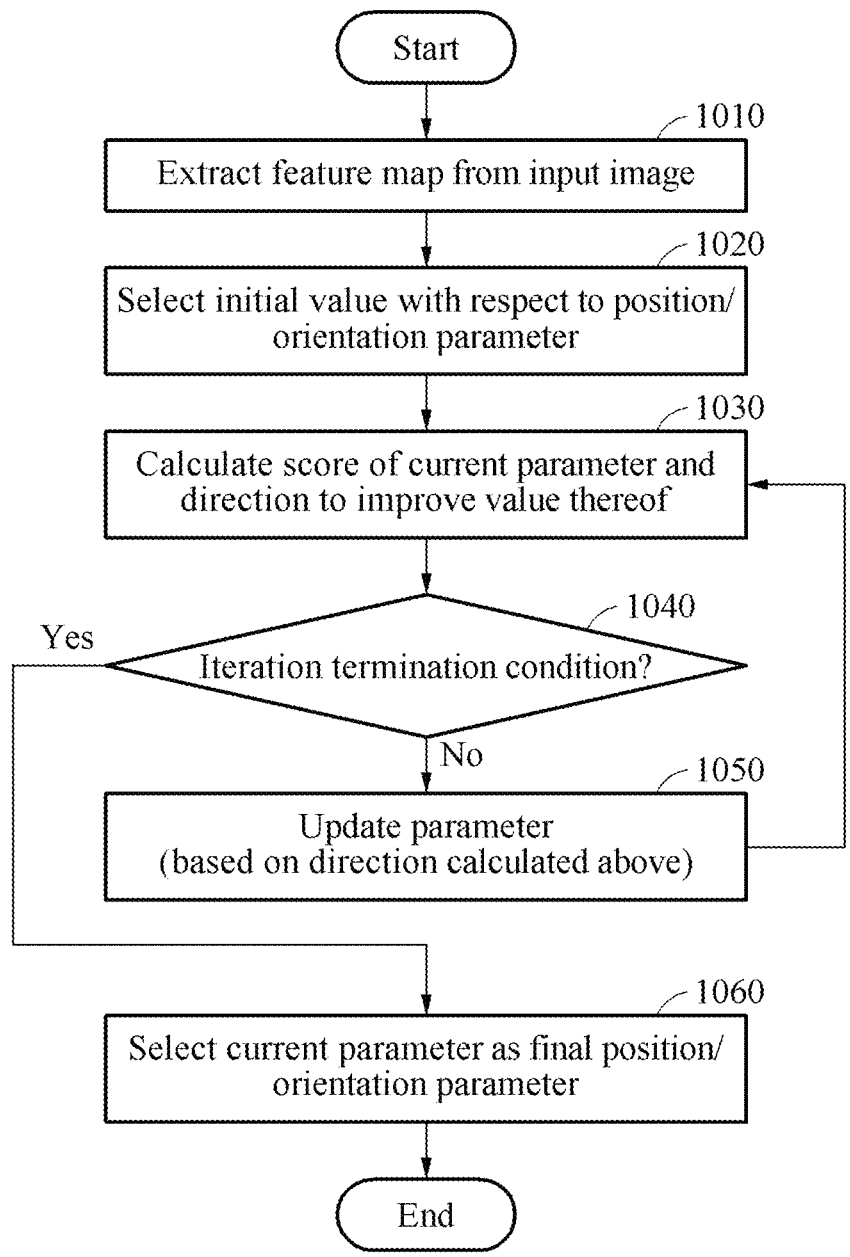
FIG. 10 illustrates an example of a localization method by parameter updating.

FIG. 10 illustrates an example of a localization method by parameter updating. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIG. 1-9E are also applicable to FIG. 10, and are incorporated herein by reference. Thus, the above description may not be repeated here Referring to FIG. 10, in operation 1010, a feature map is extracted from an input image. In operation 1020, initial localization information, for example, initial values of position/orientation parameters, is selected. In operation 1030, scores of current parameters are calculated, and a direction to improve the scores of the current parameters is calculated.

In an example, the feature map includes a probability distribution indicating a degree of closeness to an object. For example, features included in the feature map include information related to a distance to a closest object, the information expressed using normalized values between "0" and "1". In this example, the feature map provides information related to a direction toward the object. The localization apparatus pools feature values of the feature map corresponding to 2D vertices projected from the map data by the current parameters. The localization apparatus determines the direction to improve the scores of the current parameters based on the pooled feature values.

In operation 1040, a determination is made whether an iteration termination condition is satisfied. When it is determined that the iteration termination condition is not satisfied, the parameters are updated, in operation 1050. The localization apparatus updates the parameters based on the direction calculated in operation 1030. Operations 1050, 1030, and 1040 are iteratively performed until the iteration termination condition is satisfied. The iteration termination condition includes whether the scores of the parameters are greater than or equal to a target value. In an example, the iteration termination condition further includes whether an iteration count exceeds a threshold for system stability.

When it is determined that the iteration termination condition is satisfied, the current parameters are selected as final localization information, for example, final position/orientation parameters, in operation 1060.

In the example of FIG. 10, a step by step search for determining better parameters from initial values θ_0 is performed. Such a local optimization scheme requires good initial values for better performance. Thus, the example of FIG. 10 selectively includes an operation of separately estimating the initial values. For example, the example of FIG. 10 is performed while the parameters obtained through the example of FIG. 8 are regarded as the initial values. In this example, an effect of correcting values such as a camera height and a roll fixed through advance calibration to be suitable for a variation occurring in a real driving environment is achieved.

Figure 11:
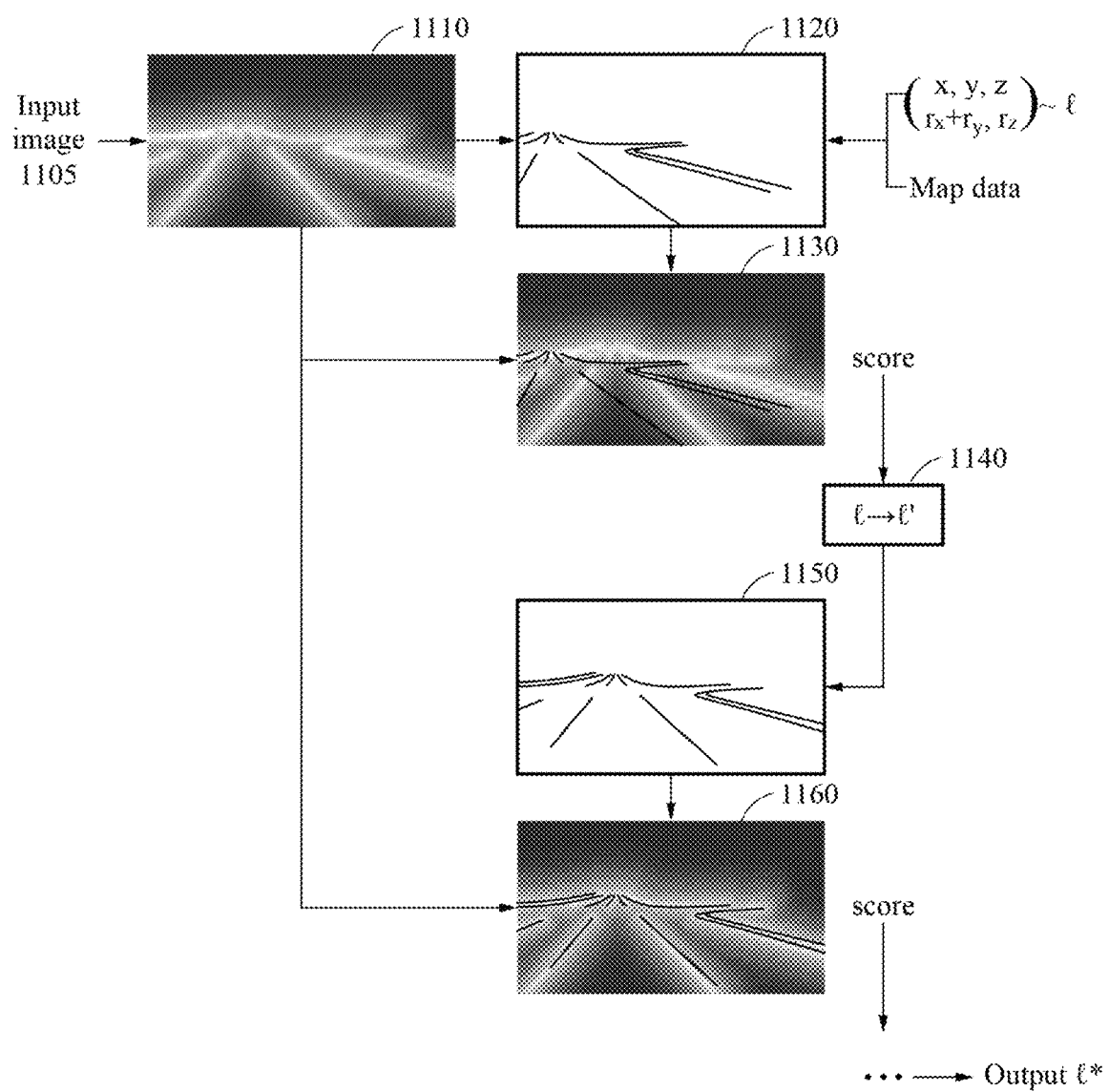
FIG. 11 illustrates an example of a result of applying a localization method by parameter updating step by step.

FIG. 11 illustrates an example of a step by step result of applying a localization method by parameter updating.

Referring to FIG. 11, an input image 1105, a first image 1110, and a second image 1120 are illustrated. The first image 1110 is generated to correspond to the input image 1105. Further, the second image 1120 is an image generated by projecting an object with respect to localization information $\ell$ (x, y, z, $r_x$, $r_y$, and $r_z$) corresponding to initial localization information based on map data. The second image 1120 is a projection image including a plurality of 2D vertices corresponding to the object.

A localization apparatus calculates a score by matching the first image 1110 and the second image 1120 as shown in an image 1130. The localization apparatus calculates the score by summing up values of pixels corresponding to the object included in the second image 1120, among a plurality of pixels included in the first image 1110.

For example, the plurality of pixels included in the first image 1110 has values between "0" and "1" based on distances to an adjacent object. Each pixel has a value close to "1" as being close to the adjacent object and has a value close to "0" as being far from the adjacent object. The localization apparatus extracts pixels matching the second image 1120 from the plurality of pixels included in the first image 1110, and calculates the score by summing up values of the extracted pixels.

The localization apparatus corrects the localization information to increase a degree of visual alignment, i.e., the score, based on a directivity of the first image 1110. The localization apparatus calculates a localization correction value such that localization information of the object included in the second image 1120 accords with the directivity of the first image 1110. The localization apparatus applies the localization correction value to the localization information corresponding to the initial localization information, thereby updating the localization information from $\ell \rightarrow \ell'$, in operation 1140. For example, the localization apparatus determines a direction in which the object of the second image 1120 is to be moved to increase the score, based on the directivity of the first image 1110. The object of the second image 1120 is moved when the localization information is updated, and thus the localization apparatus updates the localization information based on the directivity included in the first image 1110.

The localization apparatus generates an updated second image 1150 based on the updated localization information $\ell'$. The localization apparatus calculates a score by matching the updated second image 1150 and the first image 1110.

The localization apparatus outputs finally optimized localization information $\ell^*$ by calculating a localization correction value which makes the score to be greater than or equal to a criterion through the process described above.

Figure 12:
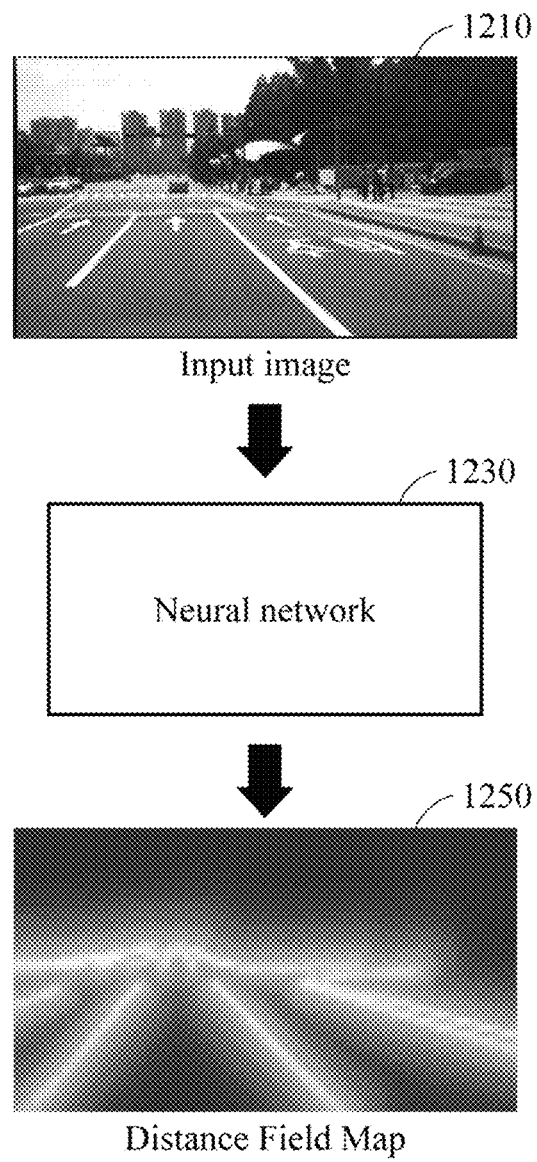
FIG. 12 illustrates an example of a neural network to generate a feature map.

FIG. 12 illustrates an example of a neural network to generate a feature map.

Referring to FIG. 12, a process of generating a distance field map 1250 corresponding to a first image by applying an input image 1210 to a neural network 1230 is illustrated.

In an example, the neural network 1230 is trained to generate a first image including a directivity corresponding to an object included in the input image 1210 based on the input image 1210. The neural network 1230 is implemented on a hardware-based model comprising a framework or a structure of a number of layers or operations to provide for many different machine learning algorithms to work together, process complex data inputs, and recognize patterns. The neural network 1230 is implemented in various structures such as, for example, a convolutional neural network (CNN), a deep neural network (DNN), an n-layer neural network, a recurrent neural network (RNN), or a bidirectional long short term memory (BLSTM). The DNN includes, for example, a fully connected network, a CNN, a deep convolutional network, or a recurrent neural network (RNN), a deep belief network, a bi-directional neural network, a restricted Boltzman machine, or may include different or overlapping neural network portions respectively with full, convolutional, recurrent, and/or bi-directional connections. The neural network 1230 maps, based on deep learning, input data and output data that are in a non-linear relationship, to perform, for example, an object classification, an object recognition, a speech recognition, or an image recognition.

The neural network may be implemented as an architecture having a plurality of layers including an input image, feature maps, and an output. In the neural network, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In an example, the neural network 1230 estimates the object included in the input image 1210 in a form of the distance field map 1250. For example, when the first image includes directivity information toward a close object as in the distance field map 1250, a directivity of optimization is determined by utilizing gradient descent. Further, when a probability distribution indicating a degree of closeness to the object is present all over the image as in the distance field map 1250, an amount of data for training increases, and thus the performance of the neural network improves when compared to a case of training with sparse data.

FIG. 13 illustrates an example of a localization apparatus.

Referring to FIG. 13, a localization apparatus 1300 includes sensors 1310 and a processor 1330. The localization apparatus 1300 further includes the memory 1350, the communication interface 1370, and the display device 1390. The sensors 1310, the processor 1330, the memory 1350, the communication interface 1370, and the display device 1390 are connected to each other through a communication bus 1305.

The sensor(s) 1310 include, for example, an image sensor, a vision sensor, an acceleration sensor, a gyro sensor, a GPS sensor, an IMU sensor, a Radar, and a Lidar. The sensor(s) 1310 acquire or capture an input image including a driving image of a vehicle. The sensor(s) 1310 senses information such as, for example, a speed, an acceleration, a travelling direction, and a steering angle of the vehicle, in addition to localization information such as, for example, GPS coordinates, a position, and an orientation of the vehicle is sensed by the sensor(s) 1310.

In an example, the localization apparatus 1300 obtains sensing information of various sensors including the input image through the communication interface 1370. The communication interface 1370 receives sensing information including a driving image from other sensors existing outside of the localization apparatus 1300.

The processor 1330 outputs the corrected localization information through the communication interface 1370 and/ or the display device 1390, or displays a virtual object along with the input image on map data based on the corrected localization information, thereby providing an AR service. Further, the processor 1330 performs the at least one method described above through FIGS. 1 through 13 or an algorithm corresponding to the at least one method.

The processor 1330 is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a multiprocessor, an application-specific integrated circuit (ASIC), and a field programmable gate array (FPGA). In an example, the processor 1330 may be a graphics processor unit (GPU), reconfigurable processor, or have any other type of multi- or single-processor configuration. The processor 1330 executes the program and controls the localization apparatus 1300. In an example, the processor 1330 executes the program and controls the neural network 1230. The program codes to be executed by the processor 1330 are stored in the memory 1350. Further details regarding the processor 1330 is provided below.

The memory 1350 stores the localization information of the localization apparatus 1300, the first image, the second image, and/or the corrected localization information. The memory 1350 stores a variety of information generated during the processing process performed by the processor 1330. In addition, the memory 1350 stores a variety of data and programs. The memory 1350 includes a volatile memory or a non-volatile memory. The memory 1350 includes a large capacity storage medium such as a hard disk to store the variety of data. Further details regarding the memory 1120 is provided below.

The display device 1390 outputs the localization information corrected by the processor 1330, or displays the virtual object along with the input image on the map data based on the corrected localization information. The display device 1390 is a physical structure that includes one or more hardware components that provide the ability to render a user interface, render a display, and/or receive user input. However, the display device 1390 is not limited to the example described above, and any other displays, such as, for example, smart phone and eye glass display (EGD) that are operatively connected to the localization apparatus 1300 may be used without departing from the spirit and scope of the illustrative examples described.

According to examples, a localization apparatus performs localization independently of viewpoints by updating 3D localization information of the localization apparatus using a result of performing the localization method described above based on a capturing device even when viewpoints of the capturing device and the localization apparatus do not match like a HUD or AR glasses. Further, the localization apparatus updates the 3D localization information and is also used to directly correct a 2D position in an image when the viewpoints of the capturing device and the localization apparatus match like a mobile terminal or a smart phone.

Examples set forth herein provide technology for localization without establishing correspondence between vertices of an image and vertices of map data. Further, the examples provide technology for localization without parameterizing features of an image, extracting a relation invariant to a three-dimensional (3D) transform and a perspective transform, or easily specifying such an invariant relation during a search of map data.

The localization apparatuses 200 and 1300, transform devices 210 and 220, feature extractor 230, pooler 240, and other apparatuses, units, modules, devices, and other components described herein with respect to FIGS. 1-13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A localization method, comprising:
generating a first image of an object from an input image;
generating a second image to project the object with respect to a plurality of candidate localization information of a device, based on map data comprising a position of the object;
pooling, from the first image, feature values corresponding to vertices in the second image;
determining scores of the plurality of candidate localization information based on the pooled feature values; and
determining a candidate localization information corresponding to a highest score to be localization information of the device
wherein the determining of the scores comprises:
determining rotational degree of freedom (DOF)s based on long-distance vertices affected below a first threshold by translational DOFs, from among vertices included in the second image;
after the determination of the rotational DOFs, determining a left and right translational DOF based on vanishing point-oriented short-distance vertices affected below a second threshold by a forward and backward translational DOF, from among short-distance vertices excluding the long-distance vertices from the second image; and
after the determination of the left and right translational DOF, determining the forward and backward translational DOF based on non-vanishing point-oriented short-distance vertices excluding the vanishing point-oriented short-distance vertices from the short-distance vertices.

2. The localization method of claim 1, wherein the generating of the first image comprises generating feature maps corresponding to a plurality of features.

3. The localization method of claim 1, wherein the generating of the second image comprises:
extracting a region corresponding to a field of view in the candidate localization information from the map data; and
projecting vertices included in the region into a projection point corresponding to the candidate localization information.

4. The localization method of claim 1, wherein the pooling comprises:
selecting pixels in the first image based on coordinates of the vertices; and
obtaining feature values of the selected pixels.

5. The localization method of claim 1, wherein the determining of the scores comprise determining a sum of the pooled feature values.

6. The localization method of claim 5, wherein the determining of the sum comprises, determining a weighted sum of the feature values based on weights determined for the features, in response to the first image comprising feature maps corresponding to features.

7. The localization method of claim 1, wherein the determining of the localization information of the device comprises:
segmenting the second image into regions; and
sequentially determining a plurality of degree of freedom (DOF) values included in the candidate localization information using scores calculated in the regions.

8. The localization method of claim 7, wherein the plurality of DOF values comprises:
three translational DOF values; and
three rotational DOF values.

9. The localization method of claim 7, wherein the segmenting comprises:
segmenting the second image into a long-distance region and a short-distance region based on a first criterion associated with a distance; and
segmenting the short-distance region into a vanishing point-oriented short-distance region and a non-vanishing point-oriented short-distance region based on a second criterion associated with a vanishing point.

10. The localization method of claim 9, wherein the sequentially determining comprises:
determining rotational DOFs based on the long-distance region;
determining a left and right translational DOF based on the vanishing point-oriented short-distance region; and
determining a forward and backward translational DOF based on the non-vanishing point-oriented short-distance region.

11. The localization method of claim 1, wherein the determining of the localization information of the device comprises:
determining a direction to improve the score based on a distribution of the pooled feature values; and
correcting the candidate localization information based on the direction.

12. The localization method of claim 11, wherein the first image comprises a probability distribution indicating a degree of closeness to the object,
wherein the determining of the direction comprises determining the direction based on the probability distribution.

13. The localization method of claim 11, wherein the determining of the localization information of the device comprises:
generating a corrected second image in which the object is projected with respect to the corrected candidate localization information; and
determining a corrected score of the corrected candidate localization information by pooling, from the first image, feature values corresponding to vertices in the corrected second image,
wherein the determining of the direction, the correcting of the candidate localization information, the generating of the corrected second image, and the calculating of the corrected score are iteratively performed until the corrected score satisfies a condition.

14. The localization method of claim 1, further comprising:
determining a virtual object on the map data to provide an augmented reality (AR) service; and
displaying the virtual object based on the determined localization information.

15. The localization method of claim 14, wherein the input image comprises a driving image of a vehicle, and
the virtual object indicates driving route information.

16. A non-transitory computer-readable storage medium storing instructions that, when executed by a processor, cause the processor to perform the localization method of claim 1.

17. The localization method of claim 1, wherein the first image comprises a probability distribution indicating a degree of closeness to the object; and
the determining of the localization information comprises determining a direction to improve the score based on a distribution of the pooled feature values, the information related to a direction towards the object being included in the first image, and correcting the candidate localization information based on the direction.

18. A localization method, comprising:
generating a first image of an object from an input image;
generating a second image to project the object with respect to candidate localization information of a device, based on map data comprising a position of the object;
segmenting the second image into a long-distance region and a short-distance region based on a first threshold associated with a distance;
segmenting the short-distance region into a vanishing point-oriented short-distance region and a non-vanishing point-oriented short-distance region based on a second criterion associated with a vanishing point; and
determining degree of freedom (DOF) values included in the candidate localization information through matching between the first image and the regions,
wherein the determining of the DOF comprises:
determining rotational DOFs based on long-distance vertices affected below a first threshold by translational DOFs, from among vertices included in the second image,
after the determination of the rotational DOFs, determining a left and right translational DOF based on vanishing point-oriented short-distance vertices affected below a second threshold by a forward and backward translational DOF, from among short-distance vertices excluding the long-distance vertices from the second image, and
after the determination of the left and right translational DOF, determining the forward and backward translational DOF based on non-vanishing point-oriented short-distance vertices excluding the vanishing point-oriented short-distance vertices from the short-distance vertices.

19. The localization method of claim 18, wherein the determining comprises determining the DOF values included in the candidate localization information by sequentially using scores calculated through the matching in the regions.

20. The localization method of claim 18, wherein the determining comprises:
calculating, while changing DOF values determined for the regions, scores corresponding to the changed DOF values by pooling, from the first image, feature values corresponding to vertices in the regions; and
selecting a DOF value corresponding to a highest score.

21. The localization method of claim 18, wherein the plurality of DOF values comprises:
three translational DOF values; and
three rotational DOF values.

22. The localization method of claim 18, further comprising:
determining a virtual object on the map data to provide an augmented reality (AR) service; and
displaying the virtual object based on the determined DOF values.

23. The localization method of claim 22, wherein the input image comprises a driving image of a vehicle, and
the virtual object indicates driving route information.

24. A non-transitory computer-readable storage medium storing instructions that, when executed by a processor, cause the processor to perform the localization method of claim 18.

25. A localization apparatus, comprising:
a processor configured to:
generate a first image of an object from an input image,
generate a second image to project the object with respect to a plurality of candidate localization information of a device, based on map data comprising a position of the object,
pool, from the first image, feature values corresponding to vertices in the second image,
determine scores of the plurality of candidate localization information based on the pooled feature values; and
determine a candidate localization information corresponding to a highest score to be localization information of the device
wherein the determining of the scores comprises:
determining rotational degree of freedom (DOF)s based on long-distance vertices affected below a first threshold by translational DOFs, from among vertices included in the second image;
after the determination of the rotational DOFs, determining a left and right translational DOF based on vanishing point-oriented short-distance vertices affected below a second threshold by a forward and backward translational DOF, from among short-distance vertices excluding the long-distance vertices from the second image; and
after the determination of the left and right translational DOF, determining the forward and backward translational DOF based on non-vanishing point-oriented short-distance vertices excluding the vanishing point-oriented short-distance vertices from the short-distance vertices.

26. A localization apparatus, comprising:
a processor configured to:
generate a first image of an object from an input image,
generate a second image to project the object with respect to candidate localization information of a device, based on map data comprising a position of the object,
segment the second image into a long-distance region and a short-distance region based on a first threshold associated with a distance,
segment the short-distance region into a vanishing point-oriented short-distance region and a non-vanishing point-oriented short-distance region based on a second criterion associated with a vanishing point; and
determine degree of freedom (DOF) values included in the candidate localization information through matching between the first image and the regions,
wherein the processor is further configured to:
determine rotational degree of freedom (DOF) values based on the long-distance region,
after the determination of the rotational DOF, determine a left and right translational DOF based on the vanishing point-oriented short-distance region, and after the determination of the left and right translational DOF, determine a forward and backward translational DOF based on the non-vanishing point-oriented short-distance region.

27. A localization apparatus comprising:
a sensor disposed on a device, and being configured to sense one or more of an image and candidate localization information of the device;
a processor configured to
generate a first image of an object from the image,
generate a second image to project the object with respect to the candidate localization information, based on map data comprising a position of the object,
segment the second image into a long-distance region and a short-distance region based on a distance,
segment the short-distance region into a vanishing point-oriented short-distance region and a non-vanishing point-oriented short-distance region based on a vanishing point,
determine a score of the candidate localization information based on pooling, from the first image, feature values corresponding to vertices in the second image,
determine localization information of the device based on the score, and
a head-up display (HUD) configured to visualize a virtual object on the map data based on the determined localization information,
wherein the processor to determine is configured to:
determine rotational degree of freedom (DOF) values based on the long-distance region;
after the determination of the rotational DOF, determine a left and right translational DOF based on the vanishing point-oriented short-distance region; and
after the determination of the left and right translational DOF, determine a forward and backward translational DOF based on the non-vanishing point-oriented short-distance region.

28. The localization apparatus of claim 27, wherein the processor is further configured to generate, using a neural network, the first image comprising feature maps corresponding to a plurality of features.

29. The localization apparatus of claim 27, wherein the second image comprise a projection of two-dimensional (2D) vertices corresponding to the object.

30. The localization apparatus of claim 27, further comprising a memory configured to store the map data, the image, the first image, the second image, the score, and instructions that, when executed, configures the processor to determine any one or any combination of the determined localization information and the virtual object.

* * * * *